United States Patent [19]

Parik

[11] 4,334,768
[45] Jun. 15, 1982

[54] RECEPTACLE FOR NEGATIVE CARRIERS

[75] Inventor: Michael H. Parik, San Francisco, Calif.

[73] Assignee: Professional Photo Products, Inc., San Rafael, Calif.

[21] Appl. No.: 172,773

[22] Filed: Jul. 28, 1980

[51] Int. Cl.$^3$ ............................................. G03B 27/62
[52] U.S. Cl. ....................................... 355/75; 353/23; 353/95
[58] Field of Search ....................... 355/75, 76, 23, 25, 355/73; 353/23, 95

[56] References Cited

U.S. PATENT DOCUMENTS 2,552,225  5/1951  Simmons et al. ...................... 355/75
2,589,680  3/1952  Denny, Sr. ............................. 355/75

Primary Examiner—Richard A. Wintercorn
Attorney, Agent, or Firm—Melvin R. Stidham

[57] ABSTRACT

A flat receptacle to be mounted on a photographic enlarger to receive negative carriers. The receptacle has openings in the top and bottom walls to enable passage of light and a slot in one side wall enables insertion of a negative carrier. Means, such as holes in the bottom wall, interlock with complementary pins or the like on the bellows. The light source housing is lowered to clamp the receptacle in place for extended use, and the negatives may be inserted in the slotted side wall without raising and lowering the lamp house.

4 Claims, 2 Drawing Figures

RECEPTACLE FOR NEGATIVE CARRIERS

BACKGROUND OF THE INVENTION

In conventional photographic enlarging work, the negative is placed in a relatively rigid frame-carrier. The lamp house is raised to enable placement of the carrier, and then lowered to make the enlargement. Then the lamp house is again raised to remove the negative. These constantly repeated movements cause wear and tear on the parts, and some misalignment often results from the repeated impacts. Moreover, the multiple step operation is time consuming.

OBJECTS OF THE INVENTION

It is an object of this invention to provide means to enable operation of an enlarger without requiring repeated raising and lowering of the lamp house.

It is a further object of this invention to provide a receptacle for a photographic enlarger which enables quick insertion of negative carriers from the front or from either side of the enlarger.

It is a further object of this invention to provide a receptacle for a photographic enlarger which greatly increases the speed of handling.

Other objects and advantages of this invention will become apparent from the description to follow, particularly when read in conjunction with the accompanying drawings.

SUMMARY OF THE INVENTION

In carrying out this invention, I provide a flat receptacle having interlock components on the bottom surface which engage complementary components, which are commonly found on the top surface of the bellows portion of a photographic enlarger. The receptacle is so positioned on the bellows and the lamp house is lowered and brought into contact with the receptacle, to clamp it in place for extended use. The receptacle has a slot in one side so that the negative carriers can be inserted and the enlargement made without raising or lowering the lamp house. The receptacle is adapted to be positioned so that negative carriers may be inserted from the front or from either left or right side.

DESCRIPTION OF A PREFERRED EMBODIMENT

Figure 1:
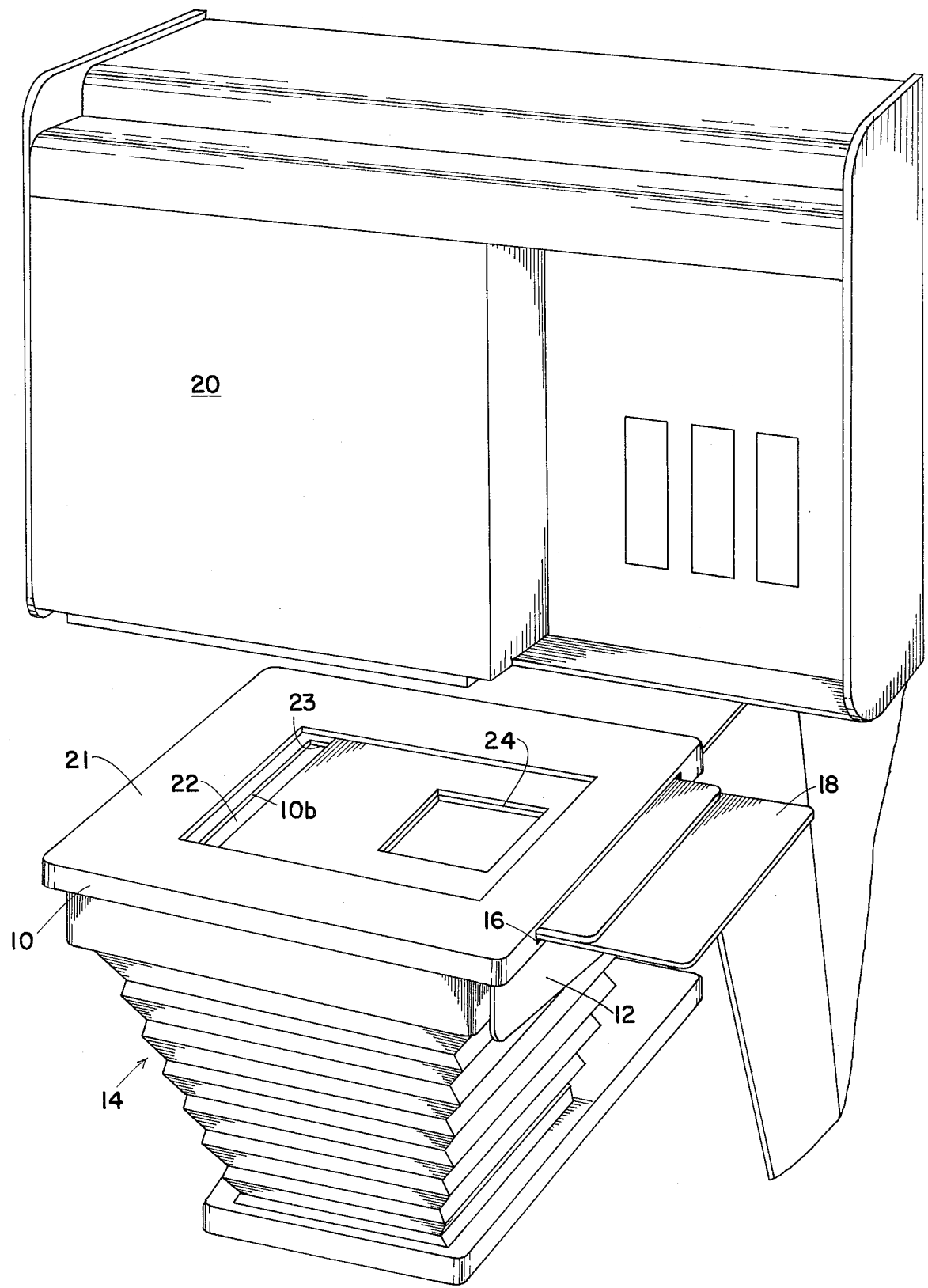
FIG. 1 is a view in perspective looking from the front and above a photograph enlarger with receptacle of this invention in place.

Referring now to FIG. 1 with greater particularity, the negative carrier receptacle 10 of this invention is mounted on the top plate 12 of an enlarger bellows 14. The flat receptacle is hollow with a slot 16 in one side to enable insertion of a negative carrier 18. As will hereinafter be described, the receptacle 10 has means which interlock with the bellows top mounting plate 12 and is further clamped in place by lowering the lamp house 20 down against the top wall 21 of the receptacle 10.

There are matching openings 22, preferably rectangular, in both the top and bottom panels 21 and 23, respectively so that light from the lamp house 20 will pass directly through the openings 24 in the negative carrier and, hence, through the negative itself for enlargement.

Figure 2:
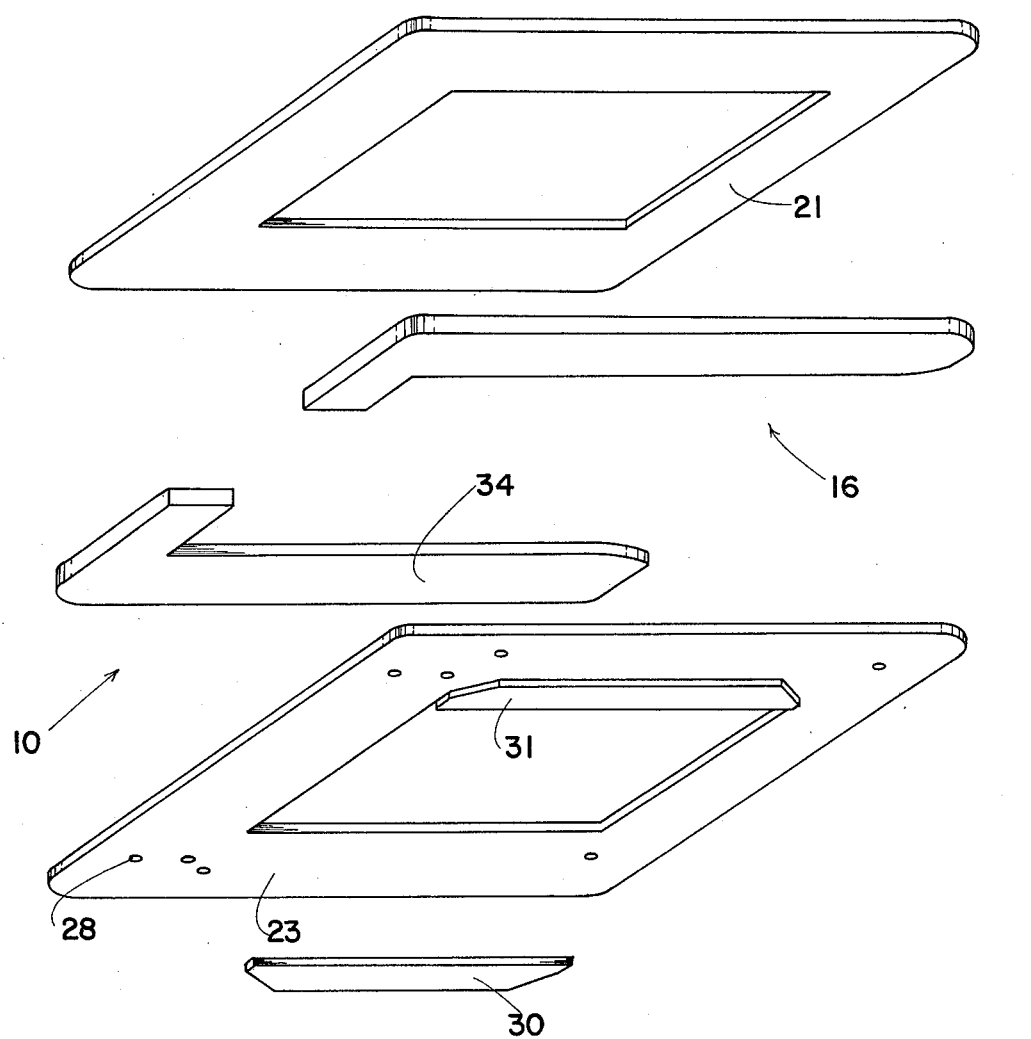
FIG. 2 is an exploded view of the receptacle and top mounting plate of the enlarger.
Figure 2:
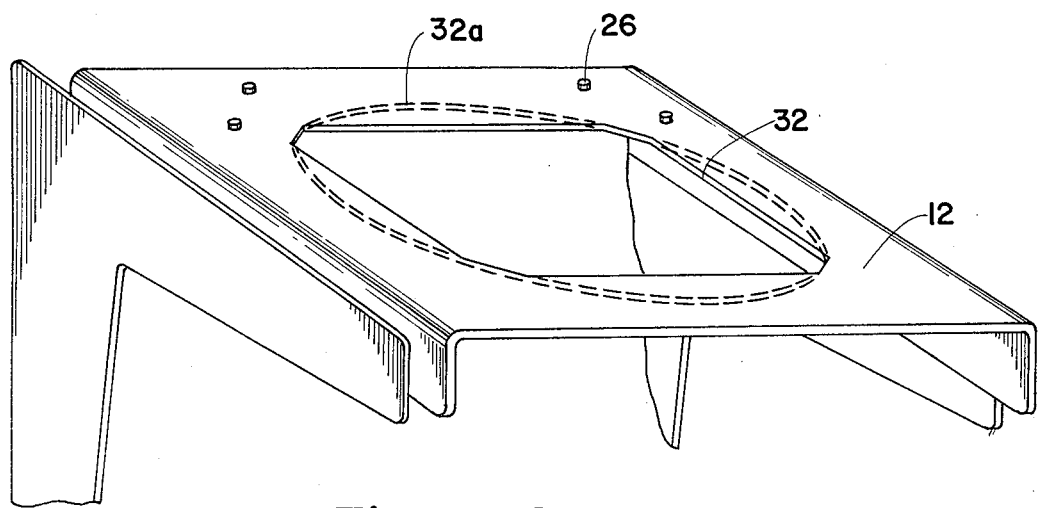

Referring now to FIG. 2 the top mounting 12 is conventionally provided with a series of pins 26 to facilitate positioning of the negative carriers. Accordingly, the bottom panel 23 of the carrier receptacle 10 is provided with a series of holes 28 which fit over the pins to interlock the receptacle with the top mounting plate. The holes 28 are disposed so that the receptacle may be supported thereon with the entry slot 16 disposed forwardly or selectively to either left or right, depending on whether the operator is left handed or right handed.

In addition, the bottom of the receptacle 10 is provided with a pair of opposing plates or blocks 30 and 31 which nest snugly into the opening 32 normally provided in the top mounting plate 12. In many enlargers in use today, the opening 32 is square as shown so that the receptacle 10 is placed down on the top mounting plate so that the holes 28 seat over the pins and the blocks 30 and 31 rest in the opening 32. Then, if it is desired to change the position of the entry slot 16, the receptacle 10 is raised and re-seated. In some of the newer enlargers, the central opening in the plate 12 is made circular as indicated at 32a, but the same blocks 30 and 31 to fit snugly within the opening 32 and, if it is desired to change the position of the slot 16, the receptacle can simply be rotated.

As shown in FIG. 2 the receptacle 10 may be of "sandwich" construction with a U-shaped member 34 sandwiched between the top and bottom panel, 21 and 23, the open end of the "U" forming the slot 16. The three sections may be secured together by any suitable means such as bonding, riveting or the like.

While this invention has been described in conjunction with a preferred embodiment thereof, it is obvious that modifications and changes therein may be made by those skilled in the art without departing from the spirit and scope of this invention, as defined by the claims appended hereto.

I claim:

1. For installation in a photographic enlarger wherein a negative in a rigid frame-carrier is positioned between a light source housing and a bellows:

a flat receptacle having rectangular top and bottom walls with openings therein for transmission of light;

blocks on the lower surface of said bottom wall on opposite sides of the opening therein adapted to engage snugly in and interlock with the opening in the top mounting plate of an enlarger bellows with the outer edges of said blocks engaging the inner edges of said mounting plate opening to prevent horizontal displacement of said receptacle, and a slot in a side wall to receive a negative carrier.

2. The receptacle defined by claim 1 including:

three side walls having a short vertical dimension interconnecting said top and bottom walls;

the fourth side being open to form said slot.

3. The receptacle defined by claim 1 wherein:

said interlock means includes:

a series of holes in said bottom wall to engage snugly over a complementary series of pins on said bellows mounting plate.

4. The receptacle defined by claim 1 wherein:

said pair of opposing blocks have arcuate outer surfaces to fit and seat in a circular aperture in said bellows mounting plate.

* * * * *